United States Patent

Russo

[15] 3,678,349

[45] July 18, 1972

[54] CAPACITOR

[72] Inventor: Paul Russo, Franklin Square, N.Y.

[73] Assignee: Polyflon Corporation, New Rochelle, N.Y.

[22] Filed: May 19, 1971

[21] Appl. No.: 144,910

Related U.S. Application Data

[63] Continuation-in-part of Ser. No. 49,746, June 25, 1970, abandoned.

[52] U.S. Cl. ............................317/243, 317/242, 317/261

[51] Int. Cl. ........................................H01g 1/08

[58] Field of Search ...............................317/242, 261, 243

[56] References Cited

UNITED STATES PATENTS 1,607,856 11/1926 Yaxley..................................317/261

3,356,916 12/1967 Scott..................................317/261 X

*Primary Examiner*—E. A. Goldberg

*Attorney*—Lawrence F. Scinto

[57] ABSTRACT

A capacitor is produced by stacking on a rod-like conductor two spaced capacitor discs separated by a metallic disc or radial element all in intimate contact, and encircling the discs with a metal retaining element in contact with the peripheries of the capacitor discs, the metal disc having a smaller diameter. The capacitor discs are formed from plastic materials such as polytetrafluoroethylene polymer or printed circuit board material or the like, clad on both sides with the cladding being removed on one side adjacent the outer periphery and on the other side adjacent a central aperture, the capacitor elements being secured in assembled relationship. A plurality of the aforesaid capacitors can be conveniently secured in stacked relationship to provide increased capacitance.

14 Claims, 11 Drawing Figures

INVENTOR.
PAUL RUSSO
BY
Ward McElhannon Brooks Fitzpatrick
ATTORNEYS

INVENTOR.
PAUL RUSSO
BY
Ward McElhannon Brooks & Fitzpatrick
ATTORNEYS

INVENTOR.
PAUL RUSSO

CAPACITOR

This application is a continuation-in-part of application Ser. No. 49,746 filed June 25, 1970, now abandoned.

The present invention relates to a capacitor and, more particularly, to a stacked disc, high frequency, nonradiating capacitor.

Radio frequency signal generating equipment of the type employed by radio and television stations usually includes a radio frequency signal generating section and a direct current power source with the latter supplying the operating power to the former. Capacitors are employed in conjunction with the connection between the power source and the generating section to isolate the radio frequency energy generated in the generating section from the power source. Such isolation is essential if the generating section is to function properly. In essence, the capacitor provides a low impedance path to ground through which the radio frequency currents can flow. At the same time the capacitor provides an extremely high impedance for direct current which for normal consideration may be considered infinite.

Heretofore, capacitors usable for such purposes as feed-through capacitors have been made using metallic plated ceramic material. However, the maximum working voltage with which such capacitors can be used effectively is about 5,000 volts. This is due to the fact that the ceramic material has low dielectric strength requiring an increase in thickness as the voltage rating goes up. Increasing the thickness, however, reduces the capacitance and increases the impedance to radio frequency energy. Currently, radio frequency signal transmitters are being designed with greater and greater power ratings. In order to achieve an increased power rating, it is necessary to operate the transmitter at higher voltages than heretofore. Voltages upward of 30,000 volts are quite common.

Capacitors constructed in accordance with the present invention have been found quite suitable for feed-through applications. However, it should be understood that the capacitor of the present invention has general capacitor utility.

With the foregoing in mind, it is an object of the present invention to provide a capacitor adapted to operate at voltages as high as 30,000 volts or higher and capable of providing effective radio frequency signal isolation.

It is a further object of the present invention to provide a capacitor which is more versatile than those known heretofore and which has a more compact physical configuration and novel construction.

In accordance with the present invention there is provided a capacitor comprising a rod-like inner conductor having a radial flange or disc of electrically conductive material at an intermediate point therealong, a pair of capacitor discs with central apertures disposed on the conductor on opposite sides of the flange with the conductor passing through the apertures, each of the discs being of larger diameter than the flange and including a base element of dielectric material having high electric breakdown strength, a first pair of annular thin electrodes laminated respectively to the sides of the discs which face the flange, the electrodes extending from the apertures to respective outer margins spaced radially inwardly from the respective peripheries of the discs and electrically contacting the flange, a second pair of annular thin electrodes laminated respectively to the sides of the discs away from the flange and extending from the peripheries of the discs to respective margins spaced outwardly from the apertures but inwardly from the outer margins of the first pair of electrodes, a conductive shell or ring encircling the discs in contact with the peripheries thereof and in electrical contact with the second pair of electrodes but insulated from the inner conductor and the first pair of electrodes, and means for establishing independent electrical connections to the inner conductor and the shell or retaining ring. It has been found particularly useful to arrange a plurality of such capacitors in stacked relationship with the respective inner capacitor conductors being electrically interconnected and the respective outer capacitor retaining members being electrically interconnected.

The invention will be better understood after reading the following detailed description of a presently preferred embodiment thereof with reference to the appended drawings wherein:

FIG. 8 is a fragmentary view showing a stacked assembly of two capacitors of the type shown in FIGS. 1 to 3; and FIG. 9 is a longitudinal sectional view through a connector used in the assembly of FIG. 8;

The same reference numerals are used throughout the drawings to designate the same or similar parts.

Figures 1, 2, 3, 4, 5:
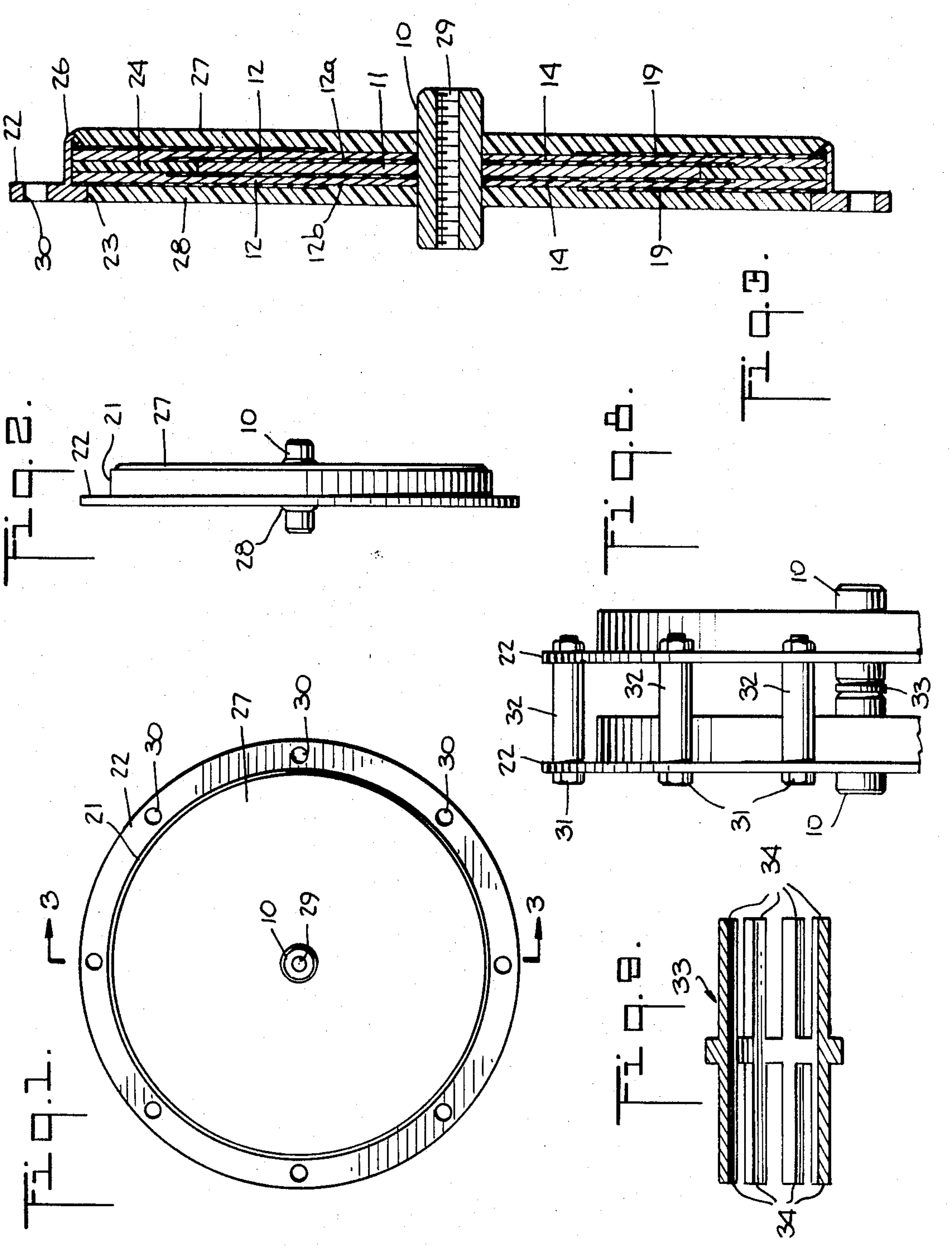
FIG. 1 is a plan view of a capacitor constructed in accordance with the invention.
FIG. 2 is a side elevational view of the capacitor of FIG. 1.
FIG. 3 is a sectional view on an enlarged scale taken along the line 3—3 in FIG. 1.
FIG. 4 is a plan view of one side of a capacitor disc employed in the assembly of FIG. 1.
FIG. 5 is a view similar to FIG. 4 showing the obverse side of the disc.
Figure 4:
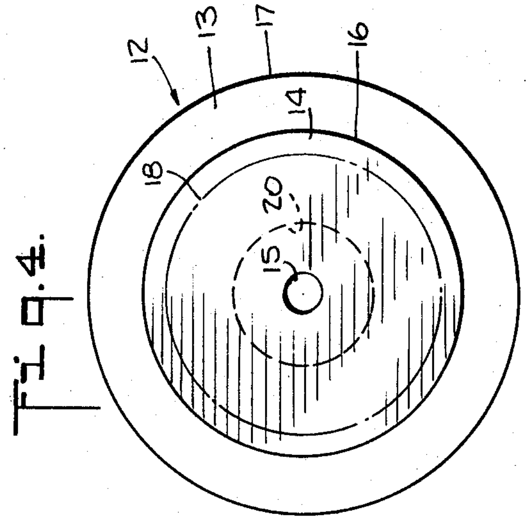

Referring now to FIGS. 1 through 5, the rod-like inner conductor of the capacitor is designated by the numeral 10 and is shown with a radial element or flange 11 mounted at an intermediate point therealong. The flange is in the form of a flat circular plate having a central aperture through which the conductor 10 passes. In order to bond the plate 11 conductively to the conductor 10, it is soft soldered thereto with a silver solder or the like.

As mentioned above, the capacitor includes a pair of capacitor discs. As best seen in FIGS. 4 and 5, the discs, designated generally by the numeral 12, consist of a base element 13 of dielectric material having high electric breakdown strength. Typically, this material is a woven glass fabric-epoxy laminate of the type commonly employed in the construction of printed circuit boards. Such material has an extremely high electrical breakdown strength and can be used in very thin layers for achieving high capacitance with high voltage rating. It has also been found that polytetrafluorethylene is suitable for use as the material of base element 13 when dissipation losses are desired to be kept to a minimum or when the capacitor is to be used at very high frequencies.

Still referring to FIGS. 4 and 5, the capacitor disc 12 is provided on one side with an annular thin electrode 14 laminated to its surface and extending from a central aperture 15 to an outer margin 16 which is spaced radially inwardly from the periphery 17 of the disc. The broken line 18 shows the relative diameter of the flange member 11 with which the disc 12 is assembled. The opposite side of the disc, best seen in FIG. 5, is provided with another annular thin electrode 19 laminated to the base material and extending from the periphery 17 of the disc to a margin 20 spaced outwardly from the aperture 15 but inwardly from the outer margin 16 of the electrode 14 which is on the opposite side of the disc.

A pair of discs 12, 12 are mounted on the conductor 10 (see FIG. 3) at **12*a* and 12*b* on opposite sides of the flange 11 with the smaller diameter electrode, i.e., electrode 14, facing the flange 11 in electrically conductive contact therewith. To ensure such electrical contact, the electrode 14 on both discs 12, 12 may be soft soldered to the flange 11. As seen in the drawing, the conductor 10 passes through the apertures 15 in the discs 12, 12**.

A conductive radially outer shell 21 having a radial mounting flange 22 is disposed so as to encircle the discs 12, 12 in contact with the peripheries thereof and in electrical contact with the pair of electrodes on the outward surfaces thereof, that is, the electrodes 19. Electrical contact is ensured by soft soldering the shell to the electrodes 19. However, it will be observed that the shell 21 is insulated from the inner conductor 10 and from the pair of electrodes 14, 14.

When constructing the assembly shown in FIGS. 1 to 3, the capacitor discs are mounted on the inner conductor 10 with the flange 11 disposed therebetween and the subassembly is inserted in the shell 21 with the inner disc abutting the shoulder 23 within the shell 21. In known manner the space between the two discs 12, 12 in the region 24 between the outer periphery of flange 11 and the wall of the shell is filled with a suitable insulating potting compound. The edge of the shell is spun over at 26 to retain the discs within the assembly. Finally, the unit is hermetically sealed by depositing the layers 27 and 28 of potting compound.

To permit mounting of the capacitor unit and the establishment of electrical contact thereto, the inner conductor may be provided with a threaded bore 29 while the flange 22 is provided with a series of apertures or bolt holes 30.

In a typical construction, the inner conductor 10, the flange 11, and the shell 21 may be made of brass. The capacitor discs 12, 12 may be formed from Panelyte grade 1655 copper-clad laminate. Such laminate qualifies as grade FR–4 established by the National Electrical Manufacturers Association. It also qualifies with respect to military specification MIL–P13949 Type GF epoxy-glass laminate. While the Panelyte material has been employed satisfactorily, any equivalent material satisfying the above specifications may be used with equal success. Capacitor discs having a thickness of approximately 0.0128 inch (this includes 1 ounce copper cladding on both sides) have been used successfully in the construction of a capacitor having a capacitance of 500 picofarads and a working voltage of 5,000 volts DC. A capacitor having a capacitance of 1,000 picofarads and a working voltage of 20,000 volts DC has been constructed employing a capacitor disc having a thickness, including the 1 ounce cladding, of approximately 0.0338 inch. While capacitor discs having a thickness less than one sixty-fourth inch have been used successfully, where an extremely high voltage rating is required it may be found necessary to use a disc having a thickness as great as one-eighth inch.

As best seen in FIG. 3, the flange or plate 11 has a relatively large diameter and a small thickness. This ensures that the inductance of the capacitor is at a minimum while the flange has the property of functioning as a heat sink. A typical thickness of the flange plate 11 is one-eighth inch.

Figure 7:
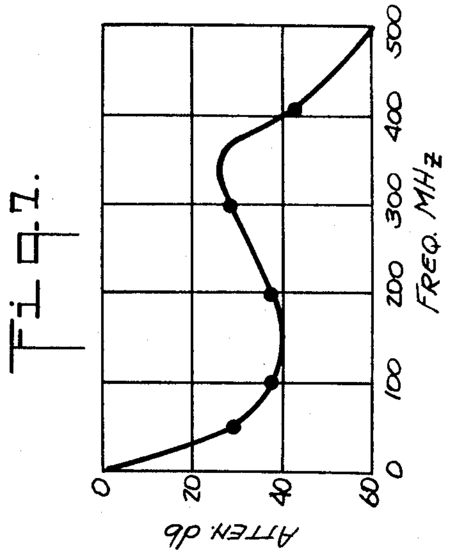
FIG. 7 is a typical attenuation curve for a similar embodiment having a capacitance of 1,000 picofarads.
Figure 5:
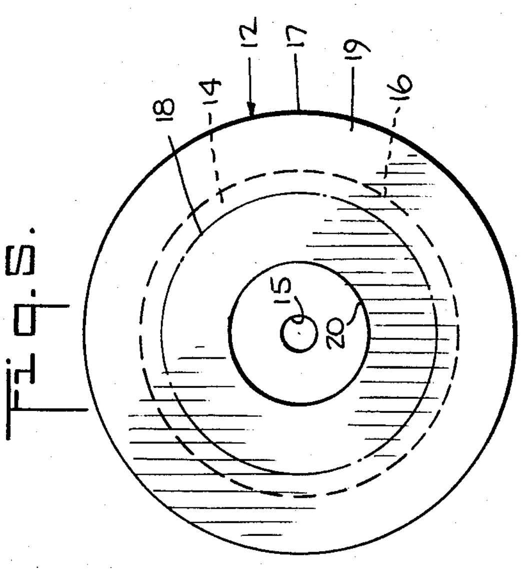
Figure 6:
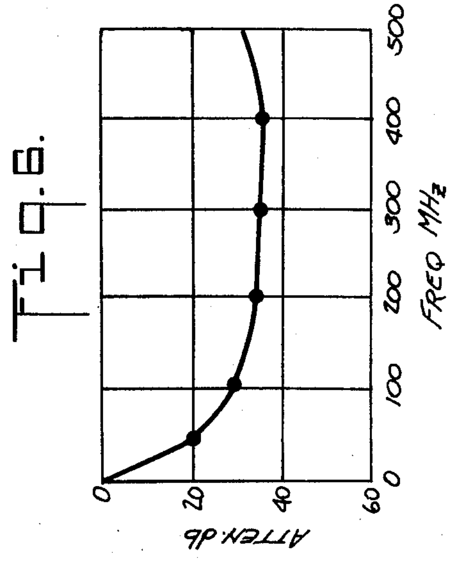
FIG. 6 is a typical attenuation curve of an embodiment having the construction shown in FIGS. 1 to 5 and a capacitance of 500 picofarads.

The potting material employed in the construction of the capacitors should be one having a low dielectric loss characteristic. Satisfactory results have been obtained with a low loss epoxy sold under the designation Stycast 2471 LV by Emerson & Cuming, Inc. The attenuation characteristics of capacitors constructed in accordance with the present invention are shown in FIGS. 6 and 7. FIG. 6 relates to a capacitor having a capacitance of 500 picofarads. The self-resonant frequency of the capacitor in question was in excess of 500 megahertz. The curve in FIG. 7 is for a capacitor having a capacitance of 1,000 picofarads and a self-resonant frequency in the vicinity of 350 megahertz.

Figure 10:
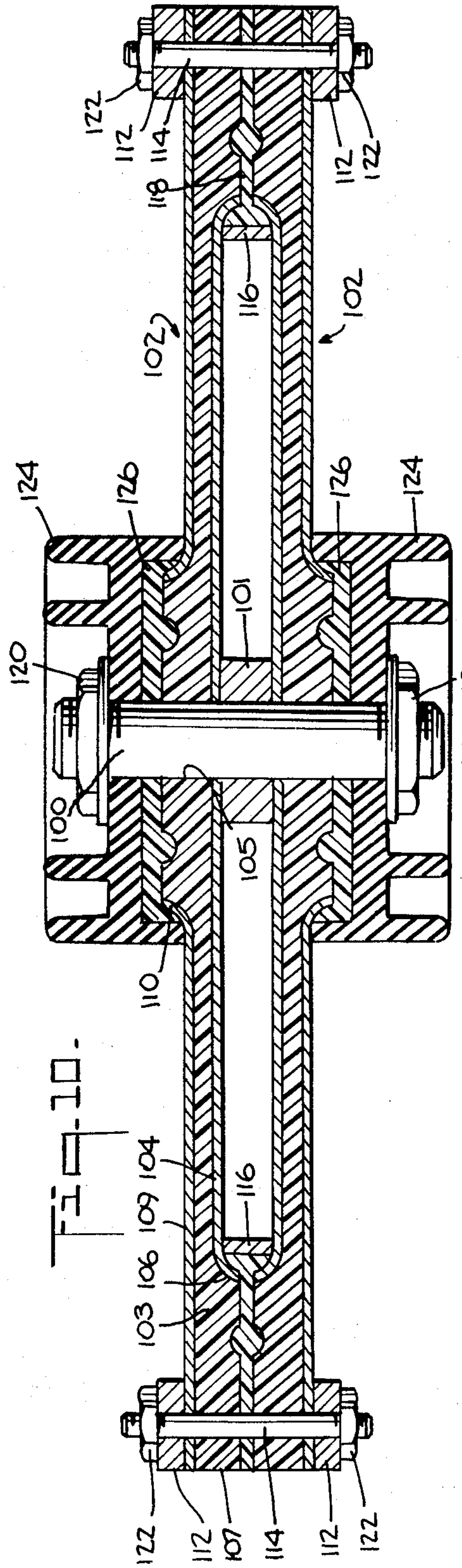
FIG. 10 is a sectional view of another embodiment of a capacitor constructed in accordance with present invention.

Turning to FIG. 10, there is disclosed another form of capacitor in accordance with the invention. In this embodiment, the inner conductor 100 is provided with a radial element 101; such as a metallic bushing, disc or flange mounted at an intermediate point therealong. Flange or disc 101 is of generally cylindrical form with a central aperture therethrough to accommodate conductor 100, to which it is conductively secured.

The capacitor includes a pair of spaced capacitor discs 102 which consist of a base element 103 of dielectric material having high electric breakdown strength. It has been found that polytetrafluorethylene is particularly suited for this use.

Capacitor disc 102 is also provided on one side with an annular thin electrode 104 laminated to its surface and extending from a central aperture 105 to an outer margin 106 which is spaced radially inwardly from the periphery 107 of the disc. The other side of disc 102 is likewise provided with an annular thin electrode 109 laminated to the base 103 and extending from the periphery 107 of the disc to a margin 110 spaced outwardly from the aperture 105 but inwardly from the outer margin 106 of electrode 104. Thus, a substantial expanse of disc 102 is provided with opposed electrode elements 102 and 104. Copper has been found to be particularly suitable for use as the metallic electrode material.

Referring specifically to FIG. 10, a pair of capacitor discs 102 are mounted on conductor 100 on opposite sides of flange or disc 101 with the smaller diameter electrode 104 of each disc 102 in electrical contact therewith.

A pair of conductive retaining rings or shells 112 are disposed about the outer peripheries of the discs 102 adjacent electrodes 109 thereof and accommodate retaining bolts 114 which maintain capacitor discs 102 in assembled relationship as shown.

To assist in maintaining alignment an internal gasket retaining ring 116 is provided; preferably of high density polyethylene. And in like manner, to seal the interior of the capacitor, there is provided an elastomeric type gasket 118 between discs 102 adjacent the outer peripheries 107 thereof. It will be understood, however, that the gasket 118 and retaining ring 116 are not an essential part of the present invention which may be practiced without their inclusion.

To permit mounting of the capacitor unit and establishment of electrical contact thereto, the inner conductor 100 in electrical contact with electrodes 104 is threaded and provided with terminal connector nuts 120 while assembly bolts 114 in electrical contact with retaining rings 112 and electrodes 109 are likewise threaded at each end and provided with terminal nuts 122.

Since, conductor 100 is normally the "live" or "hot" conductor, each end thereof is provided with a suitable insulator cap 124 separated by a suitable gasket element 126 from the capacitor interior.

Capacitors constructed as described and shown with reference to FIGS. 1 to 5 and FIG. 10 lend themselves admirably to stacking for the purpose of providing increased capacitance with a high voltage rating. One such unit has been constructed by assembling in parallel five individual units to provide a capacitance of 10,000 picofarads with a working voltage rating of 25,000 volts DC.

FIG. 8 illustrates the method of stacking the capacitors of FIGS. 1–5 wherein the flanges 22 are joined by tie bolts 31 passing through tubular spacers 32 with the inner conductors 10 electrically interconnected by a telescopingly interfitted spring connector 33, shown in detail in FIG. 9. For this purpose the conductors 10 will be smooth bored at least at the ends joined by connector 33 so that the spring fingers 34 of the connector make good electrical contact therewith. It will be understood that further capacitor units can be added to the assembly by using longer tie bolts, and additional spacers and conductors.

Figure 11:
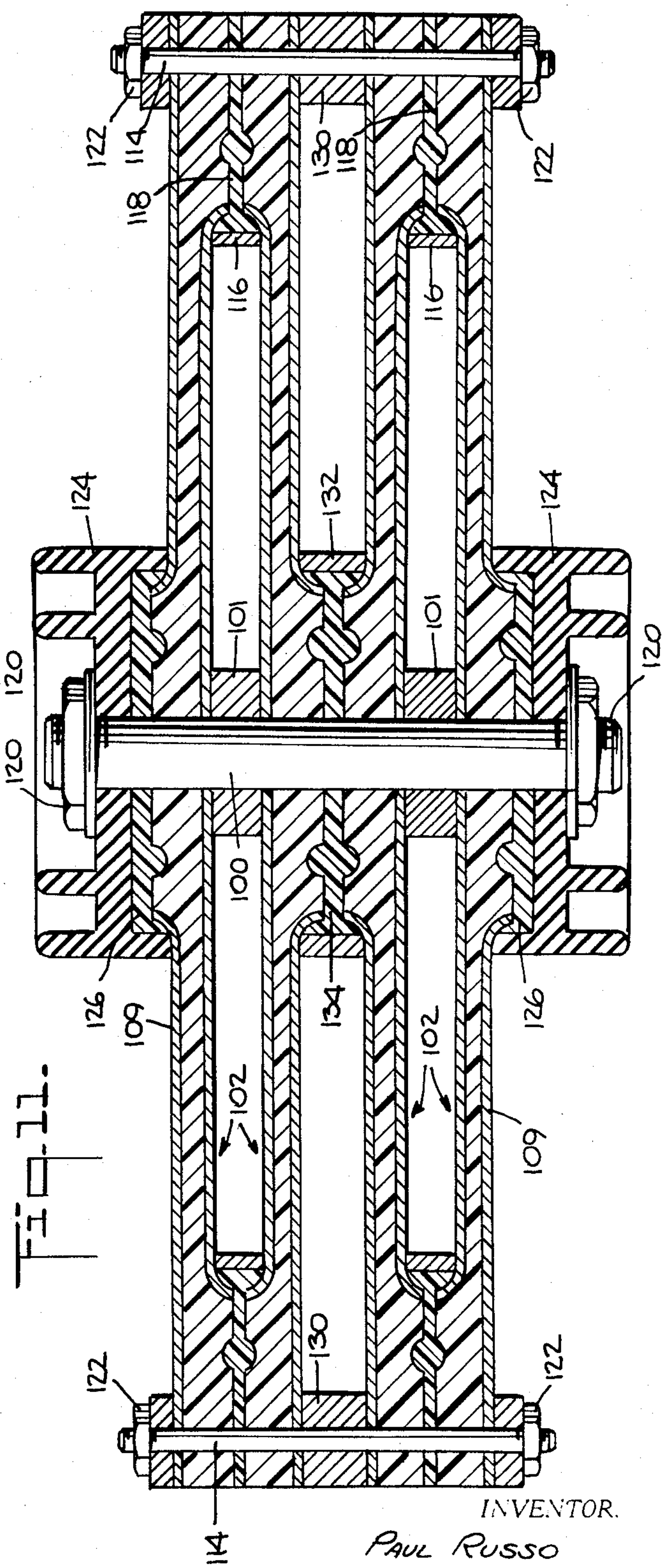
FIG. 11 is a sectional view of a stacked assembly of two capacitors of the type shown in FIG. 10.

FIG. 11 illustrates the method of stacking the capacitors of FIG. 10 wherein the outer retaining ring bolts 114 and inner conductor 100 are elongated and adapted to extend between the two capacitors to be stacked. Spacers 130 through which bolts 114 pass maintain the capacitors in spaced stacked relationship while internal spacer ring 132, preferably of polyethylene or like material and an elastomeric gasket 134 maintain internal relationship of the capacitor elements. It will be understood that further capacitor units can be added to the assembly by using longer retaining bolts and conductors and additional spacers and gaskets.

Having described the invention with reference to a presently preferred embodiments thereof, it will be understood by those skilled in the art that various changes in constructions may be made therein without departing from the true spirit of the invention as defined in the appended claims.

What is claimed is:

1. A capacitor comprising a rod-like inner conductor having a radial element of electrically conductive material at an intermediate point therealong, a pair of capacitor discs with central apertures disposed on said conductor on opposite sides of said radial element with the conductor passing through said apertures, each of said discs being of larger diameter than said radial element and including a base element of dielectric material having high electric breakdown strength, a first pair of annular thin electrodes laminated respectively to the sides of the discs which face said radial element, said electrodes extending from said apertures to respective outer margins spaced radially inwardly from the respective peripheries of said discs and electrically contacting said radial element, a second pair of annular thin electrodes laminated respectively to the sides of said discs away from said radial element and extending from said peripheries of said discs to respective margins spaced outwardly from said apertures but inwardly from said outer margins of said first pair of electrodes, a conductive retaining member encircling said discs in contact with said peripheries thereof and in electrical contact with said second pair of electrodes but insulated from said inner conductor and said first pair of electrodes, and means for establishing independent electrical connections to said inner conductor and said retaining member.

2. A capacitor according to claim 1, wherein the diameter of said radial element is slightly less than the said outer margins of said first pair of electrodes.

3. A capacitor according to claim 1, wherein the dielectric material is a woven glass fabric-epoxy laminate, and wherein said electrodes are in the form of copper cladding on said material.

4. A capacitor according to claim 1, wherein said retaining member is a conductive shell and the capacitor discs are encapsulated between said inner conductor and said shell by insulating layers of a potting compound.

5. A capacitor according to claim 1, wherein said radial element comprises a flat plate having a central aperture through which said inner conductor passes, said plate being conductively bonded to said conductor and having a large diameter and a small thickness such that the inductance of said capacitor is minimized while said flange has the property of functioning as a heat sink.

6. A capacitor according to claim 1, wherein said capacitor discs each have a thickness no greater than one-eighth inch.

7. A capacitor according to claim 1, wherein said dielectric material is polytetrafluoroethylene and the electrodes are in the form of copper cladding on said material.

8. A capacitor according to claim 1 wherein said radial element is a support disc having a central aperture through which said inner conductor passes, said disc being conductively bonded to said conductor, and wherein said capacitor discs include a base element of polytetrafluoroethylene having copper electrodes affixed thereto and said retaining member comprises a pair of ring members, one of which is in electrical contact with each of said second electrode, said ring members being constructed and arranged to secure said capacitor discs in stacked, assembled relationship.

9. A multiple capacitor comprising a plurality of capacitor units of generally flat configuration with a central rod-like inner conductor electrically interconnecting said capacitor units and a concentric retaining member having retainer elements, said elements being joined in parallel spaced relationship by tie means and spacer means and electrically interconnecting said capacitor units.

10. A capacitor according to claim 9, wherein each of said capacitor units comprises a rod-like inner conductor having a radial element at an intermediate point therealong, a pair of capacitor discs with central apertures disposed on said conductor on opposite sides of said radial element with the conductor passing through said apertures, each of said discs being of larger diameter than said radial element and including a base element of dielectric material having high electric breakdown strength, a first pair of annular thin electrodes laminated respectively to the sides of the discs which face said radial element, said electrodes extending from said apertures to respective outer margins spaced radially inwardly from the respective peripheries of said discs and electrically contacting said radial element, a second pair of annular thin electrodes laminated respectively to the sides of said discs away from said radial element and extending from said peripheries of said discs to respective margins spaced outwardly from said apertures but inwardly from said outer margins of said first pair of electrodes, and a conductive retaining member encircling said discs in contact with said peripheries thereof and in electrical contact with said second pair of electrodes but insulated from said inner conductor and said first pair of electrodes.

11. The capacitor according to claim 10 wherein said base element is formed of polytetrafluoroethylene and the electrodes are in the form of copper cladding on said material.

12. The capacitor of claim 10 wherein said radial element is a support disc having a central aperture through which said inner conductor passes, said disc being conductively bonded to said conductor, and wherein said capacitor discs includes a base element of polytetrafluoroethylene having copper electrodes affixed thereto and said retaining member comprises a pair of ring members, one of which is in electrical contact with each of said second electrodes, said ring members being constructed and arranged to secure said capacitor discs in assembled relationship.

13. A multiple capacitor comprising a plurality of capacitor units of generally flat configuration with a central rod-like inner conductor and a concentric retainer provided with a generally flat retainer element, the retainer element of said units being electrically joined in parallel spaced relationship while the inner conductors of adjacent units are electrically interconnected in general alignment.

14. The capacitor of claim 13 wherein each capacitor unit includes capacitor elements comprising a base element of polytetrafluorethylene and electrodes in the form of cladding on said base material.

* * * * *